(12) United States Patent
Orndorff, Jr. et al.

(10) Patent No.: US 6,238,093 B1
(45) Date of Patent: May 29, 2001

(54) PARTIAL ARC BEARING ASSEMBLY AND METHOD OF MAKING THE SAME

(75) Inventors: Roy Lee Orndorff, Jr., Kent, OH (US); Philip Paul Brady, Leland; Warren Keith Langston, Atkinson, both of NC (US)

(73) Assignee: Duramax Marine, LLC, Middlefield, OH (US)

( * ) Notice: Subject to any disclaimer, the term of this patent is extended or adjusted under 35 U.S.C. 154(b) by 0 days.

(21) Appl. No.: 09/287,613

(22) Filed: Apr. 7, 1999

Related U.S. Application Data

(62) Division of application No. 08/842,857, filed on Apr. 17, 1997, now Pat. No. 5,932,049.

(51) Int. Cl.[7] ............................................. F16C 17/03
(52) U.S. Cl. ........................ 384/98; 384/97; 384/125
(58) Field of Search .......................... 384/98, 97, 117, 384/125, 308

(56) References Cited

U.S. PATENT DOCUMENTS

| | | |
|---|---|---|
| 1,376,043 | 4/1921 | Sherwood . |
| 1,416,988 | 5/1922 | Sherwood . |
| 1,510,804 | 10/1924 | Sherwood . |
| 3,184,362 | 5/1965 | Litsky et al. . |
| 3,668,040 | 6/1972 | Clark . |
| 3,779,828 | 12/1973 | Clark . |
| 4,725,151 * | 2/1988 | Orndorff .............................. 384/97 |
| 5,033,871 * | 7/1991 | Ide ...................................... 384/98 |
| 5,256,237 | 10/1993 | Mass et al. . |
| 5,509,738 | 4/1996 | Haynes et al. . |

FOREIGN PATENT DOCUMENTS 0188664   10/1985   (EP) .

* cited by examiner

Primary Examiner—Lenard A. Footland
(74) Attorney, Agent, or Firm—D. Peter Hochberg; Katherine R. Vieyra; William H. Holt

(57) ABSTRACT

A bearing assembly for supporting a drive shaft includes a cylindrical housing, and a plurality of elastomeric bearing sections disposed within the housing. The bearing sections are bonded to the housing by first applying a pattern of alternating parallel lines of adhesive to the inner diameter of the housing, installing the bearing sections, and inflating an airbag within the housing to thereby apply a uniform radial pressure to the inside of the housing while the adhesive cures.

4 Claims, 7 Drawing Sheets

PARTIAL ARC BEARING ASSEMBLY AND METHOD OF MAKING THE SAME

This is a division of Ser. No. 08/842,857 filed Apr. 17, 1997, now U.S. Pat. No. 5,932,049.

TECHNICAL FIELD

This invention relates to a bearing assembly and more particularly to a new and novel bearing assembly for use in supporting a water lubricated propeller shaft as in large naval ships.

BACKGROUND OF THE INVENTION

Bearing assemblies with elastomeric bearing elements are known to be particularly well suited for this purpose because of their excellent ability to withstand the effects of corrosive fluids and to abrasion resulting from particles of foreign matter carried in suspension in the sea water in which the shaft and bearing assembly operates.

One type of such bearing assembly includes an outer non-corrosive support or shell and a plurality of circumferentially evenly spaced elastomeric staves provided therein which support by selectively contacting the shaft.

Another type of such bearing assembly includes an outer non-corrosive support or shell and a larger elastomeric bearing contact surface provided therein which contacts the shaft over a larger circumferential area than the stave type bearing. This type of bearing is known as a round bore or partial arc bearing (in some cases).

Partial arc bearings are difficult to manufacture because of the exacting tolerances to which they must be made. Heretofore, partial arc bearings have been manufactured by attaching bearing members to the inner surface of the shell and machining the elastomer down to the proper dimension. The machining process, however, scars the elastomer, thereby significantly raising the coefficient of friction between bearing and shaft and the wear rate of both members.

Efforts to improve such bearings and their manufacture have led to continuing developments to improve versatility, practicality and efficiency.

DISCLOSURE OF THE INVENTION

An object of the present invention is to provide a method of making a round bore or partial arc bearing comprising the steps of A) providing a cylindrical bearing shell; B) applying a bonding agent to the inner diameter of said bearing shell; C) disposing bearing material onto said bonding agent to thereby provide a bearing assembly; D) inflating a pneumatic device within said bearing assembly to thereby apply radial pressure to said bearing material; and, E) curing said bonding agent while said radial pressure is applied.

The present invention provides a partial arc bearing having reduced coefficient of friction and wear rate while reducing manufacturing costs.

These and other objects, features and advantages of the present invention will become more apparent in the light of the detailed description of exemplary embodiments thereof, as illustrated by the drawings.

BRIEF DESCRIPTION OF THE DRAWINGS

FIG. 2a is an enlarged detail view of the portion of FIG. 2 within line 2a–2a.

DETAILED DESCRIPTION

Figure 1:
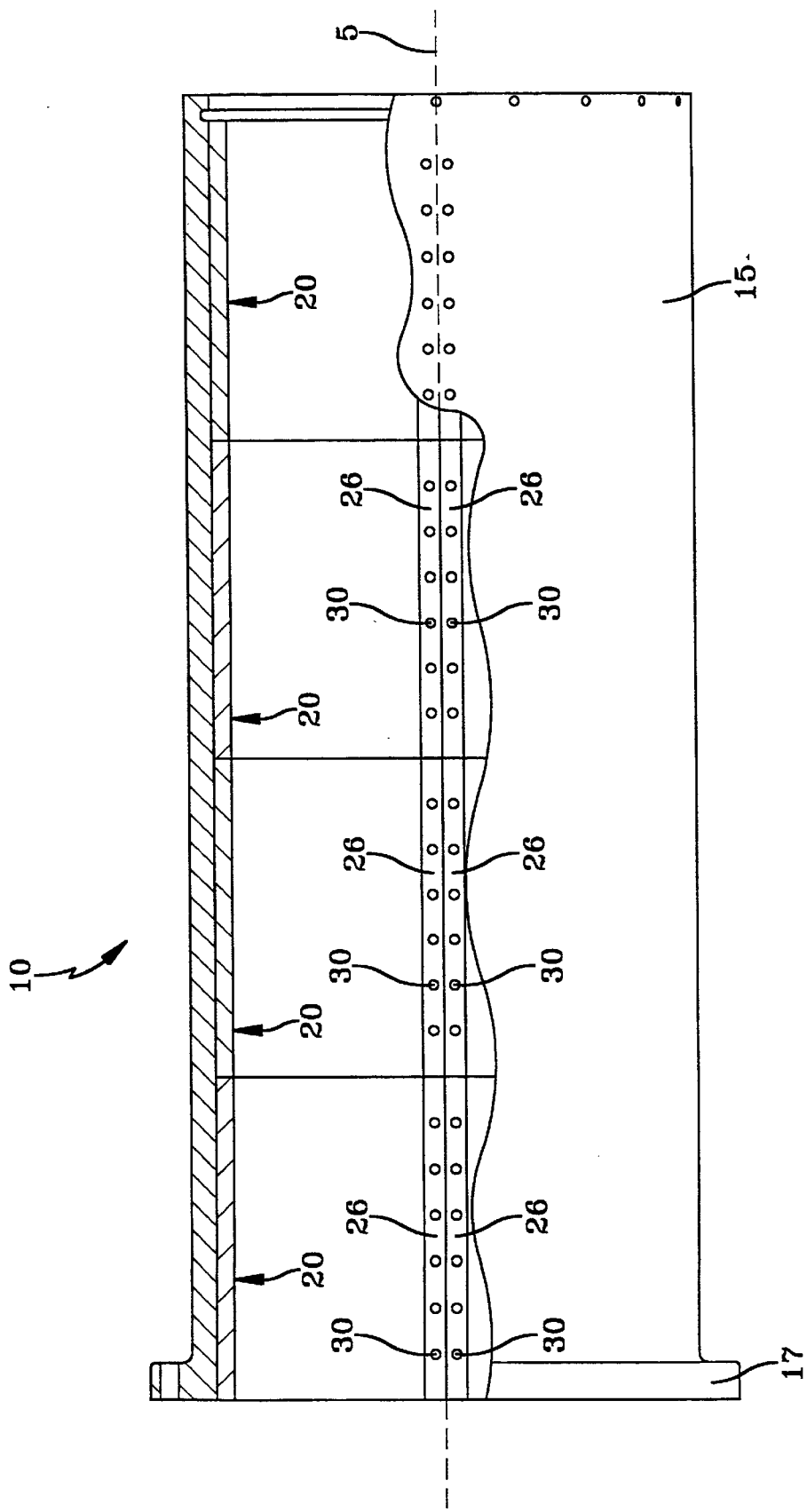
FIG. 1 is a side view, partly broken away, of a bearing assembly in accordance with the present invention.
Figure 2:
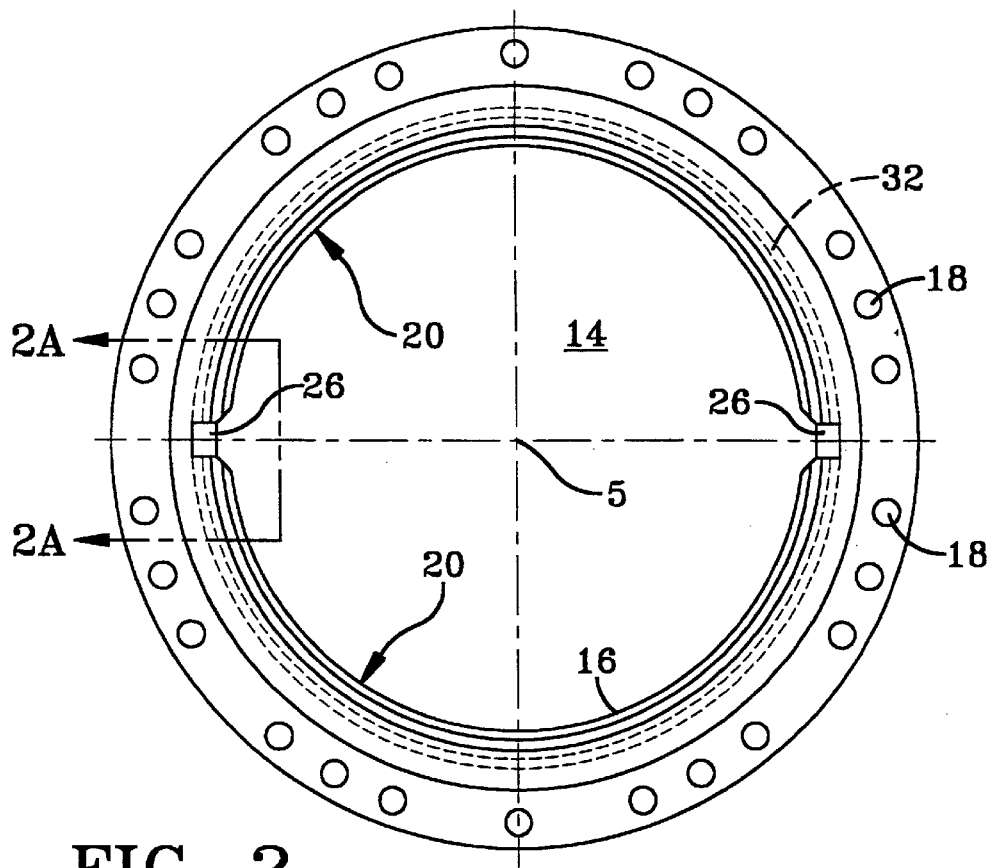
FIG. 2 is an end view of a bearing assembly in accordance with the present invention.
Figure 2A:
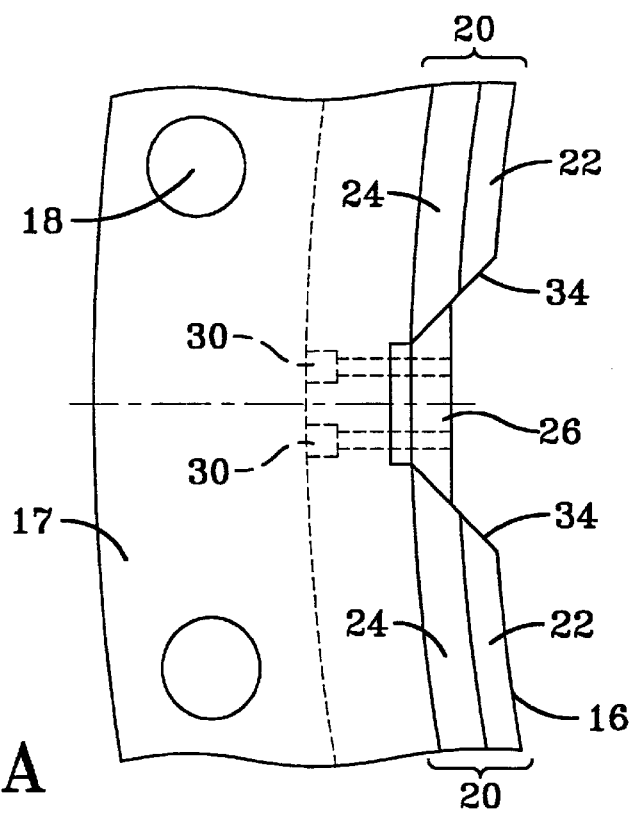
Figure 3:
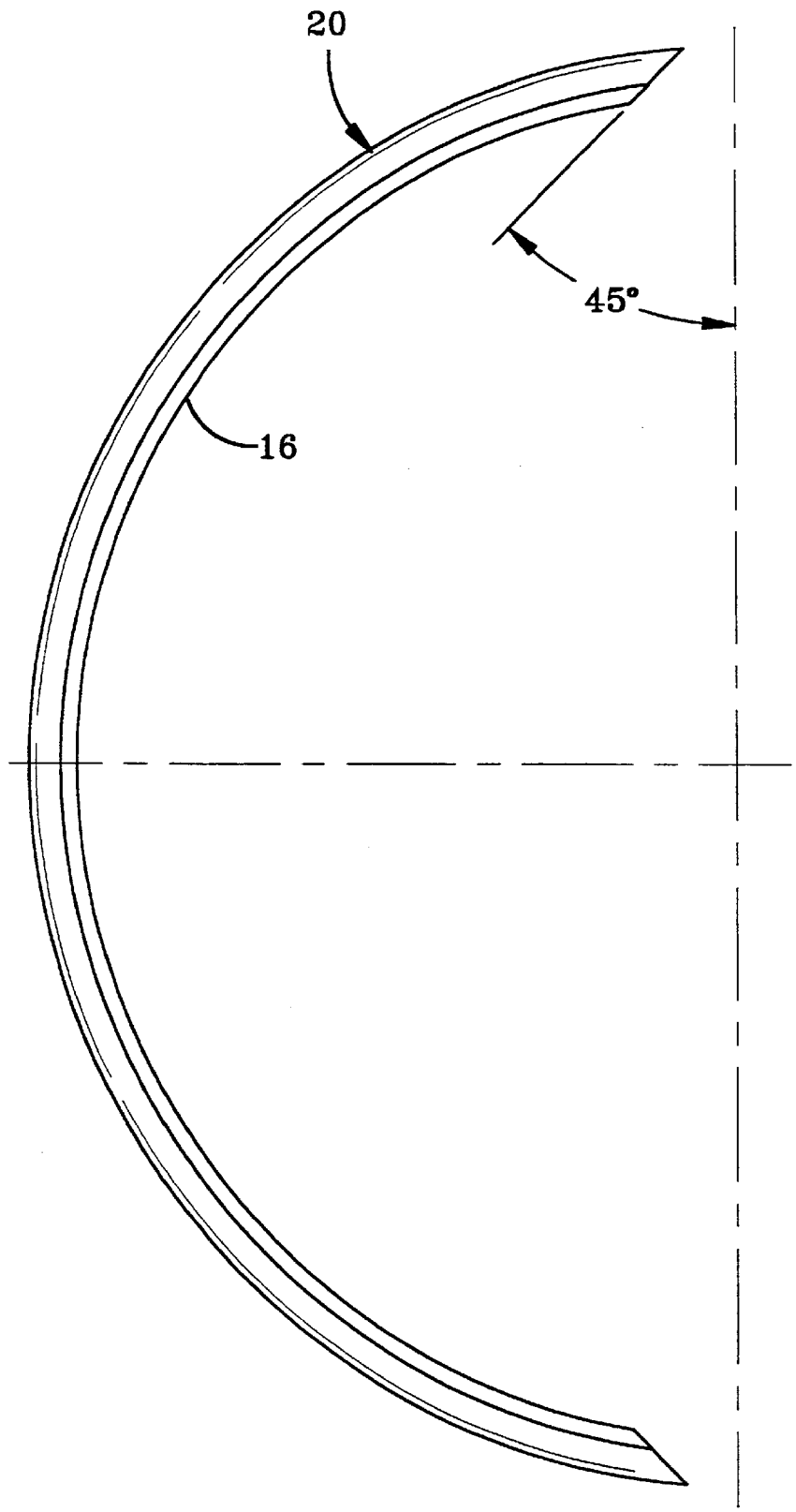
FIG. 3 is an end view of a portion of bearing material in accordance with the present invention.

Referring to the drawings, wherein like reference numerals designate like or corresponding parts throughout the several views, there is shown in the figures a bearing assembly 10 having an outer cylindrical bearing housing 15. Disposed about an axial centerline 5. Such rigid bearing housing 15 may be a metallic structure such as brass, a plastic shell, a composite nonmetallic structure with a plurality of annularly disposed radially adjacent layers or a composite structure derived from fibers reinforced or impregnated with a resin matrix. Housing 15 has a flange 17 having mounting holes 18 provided therein.

Attached to the inner surface of housing 15 is a plurality of partial arc bearing sections 20. Bearing assembly 10 is shown having eight bearing sections 20, although more or less may be utilized. Each bearing section 20 extends circumferentially approximately 180 degrees around the interior of housing 15. Each bearing section 20 has a smooth bearing surface 16. Bearings sections 20 define a central bore 14 for receiving a shaft (not shown) therein which contacts the bearing surface 16. Bearing sections 20 are retained by a plurality of retaining strips 26 which are securably attached to housing 15 utilizing bolts or screws 30. It is preferred to provide chamfers 34 on the circumferential ends of sections 20, to provide a good interface with retaining strips or rails 26 and to prevent protrusion of section 20 toward the center of the bore 14.

Bearing sections 20 are preferably made of two layers 22, 24 and is preferably an elastomer layer 22 adhered to a fiberglass reinforced epoxy shell 24. An elastomer is defined as a substance that can be stretched at room temperature to at least twice its original length and, after having been stretched and the stress removed, returns with force to approximately its original length in a short time. (See Glossary of Terms as prepared by ASTM Committee D-11 on Rubber and Rubber-like Materials, published by the American Society of Testing Materials). The elastomeric or rubber material that can be used in constructing the present invention includes any of the well known elastomers, such as natural rubber, nitrile rubber, SBR rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorosilicone rubbers, silicone rubber, chlorosulfonated polyethylene, polyacrylates, polybutadiene, polychloroprene and the like. As noted before, however, nitrile rubber and other elastomers that have high elasticity are most preferred. Such elastomers have lower shore A hardness (less than 90). The preferred material is catalog number H-201 available from the B.F.Goodrich Company. H-201 is a nitrile rubber having a shore A hardness on the order of 85±5.

Composite shell 20 is most preferably comprised of fiberglass reinforced epoxy, with a glass content on the order of 70% by weight.

Manufacture of the bearing assembly sections 20 is as follows.

A. Molding of Bearing Sections

1. Mill the uncured H-201 rubber into a sheet so that it will fit into the appropriate mold. The mold bottom plate should have a smooth surface finish (i.e., less than 8 microinches).
2. Preheat the mold to 215° F. Tape a 0.250 inch diameter rope around the perimeter of the plate and load the milled sheet into the mold, keeping it centered. Place a thin polyester sheet, preferably MYLAR, over the entire top surface of the elastomer. MYLAR is a trademark of DuPont deNemours E.I. Company. Close the mold for 20 minutes at 215° F. and low pressure (less than 1,000 psi). This shapes the elastomer sheet. Then open the mold and replace the wrinkled MYLAR with an unwrinkled piece. Then close the mold and cure for 45 minutes at 310° at high pressure (2,000 to 2,600 psi).
3. With no cool down, open the press and remove the cured sheet from the mold and cut to shape. Then trim the rope away from the edge.
4. Sand the rubber off the back of the section (i.e., the surface opposite the smooth bearing surface) to the desired thickness using an automatic grinding machine. The composite housing ID, adhesive bond layer thickness, shaft OD and desired clearance between shaft and bearing are all involved in calculating the desired rubber thickness.

B. Making of the Composite Housing

1. Utilizing a Model 11-A filament winding machine available from Dura Wound Company, wind fiberglass strands impregnated with an epoxy resin over an appropriately dimensioned composite mandrel to the desired outside diameter value. Cover the mandrel with MYLAR tape before winding. The filament angle should be on the order of a 78 degree angle to the axial centerline in order to maximize hoop strength and minimize spring-back.
2. Cure the housing at room temperature for 48–72 hours.

B. Mandrel Removal and Machining of Composite Housing

1. Pull the housing off of the mandrel.
2. Peel the MYLAR off of the ID surface of the housing. Measure and average a rough ID measurement. Cut the lathe soft jaws to the rough ID measurement. Machine length and half of the ID. Cut the soft jaws to the finished ID dimension. Then turn the shell end to end, and finish the ID and OD to the proper dimensions. It is to be noted that the housing may be milled down to 0.0001 inches of the desired ID dimension.

C. Bonding of Sanded Elastomer Bearing Sections to the Housing

1. Cut the rubber elastomer sections to the proper final size. Mark the centerline on the ID of the housing. Mix together an adhesive of approximately 50% (by volume) epoxy, catalog number EL 2995A available from the B.F.Goodrich Company and 50% (by volume) amine, catalog number EL 2995B available from the B.F.Goodrich Company.

Figure 4:
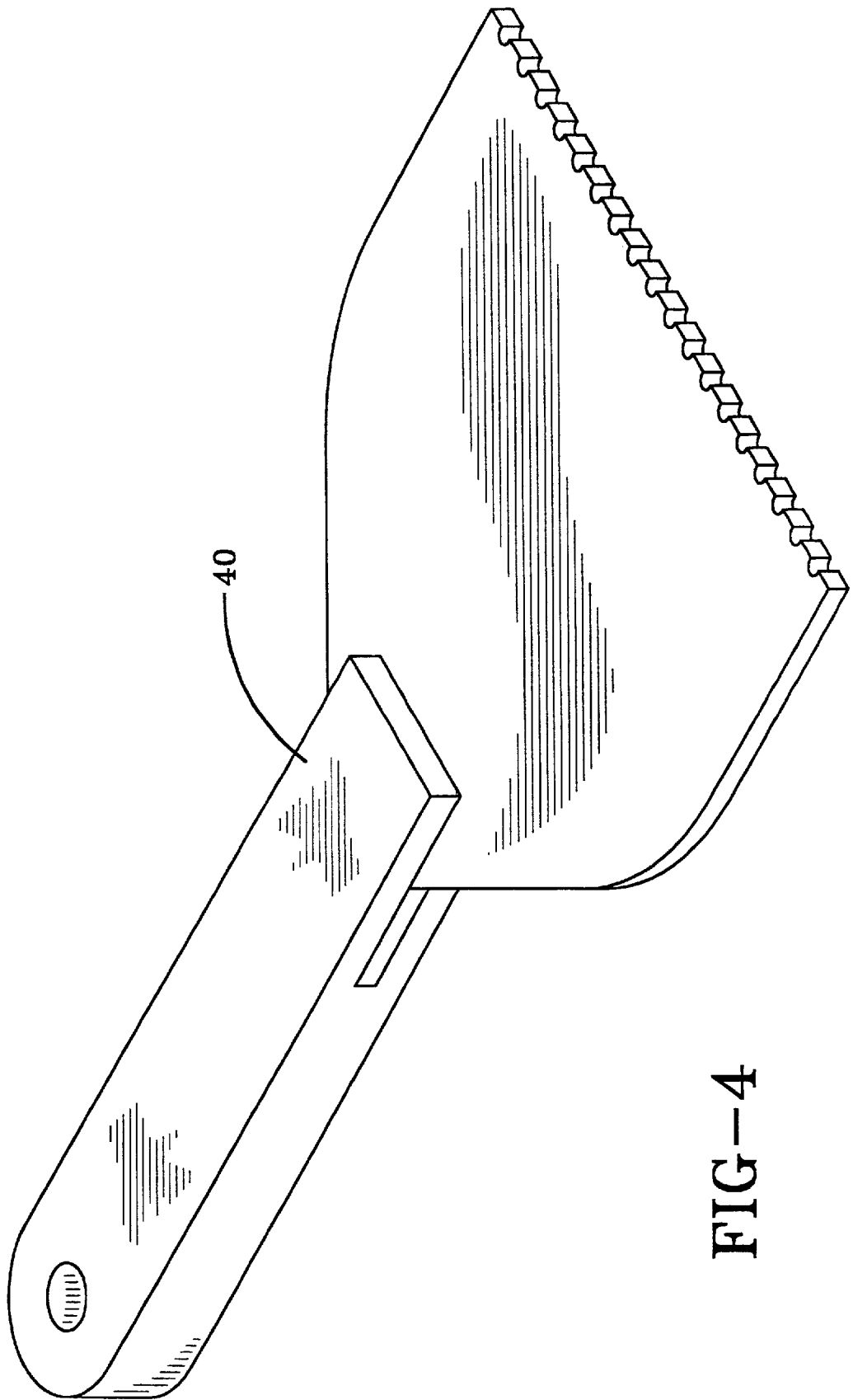
FIG. 4 is an isometric view of a tool for applying adhesive for a bearing assembly in accordance with the present invention.
Figure 4A:
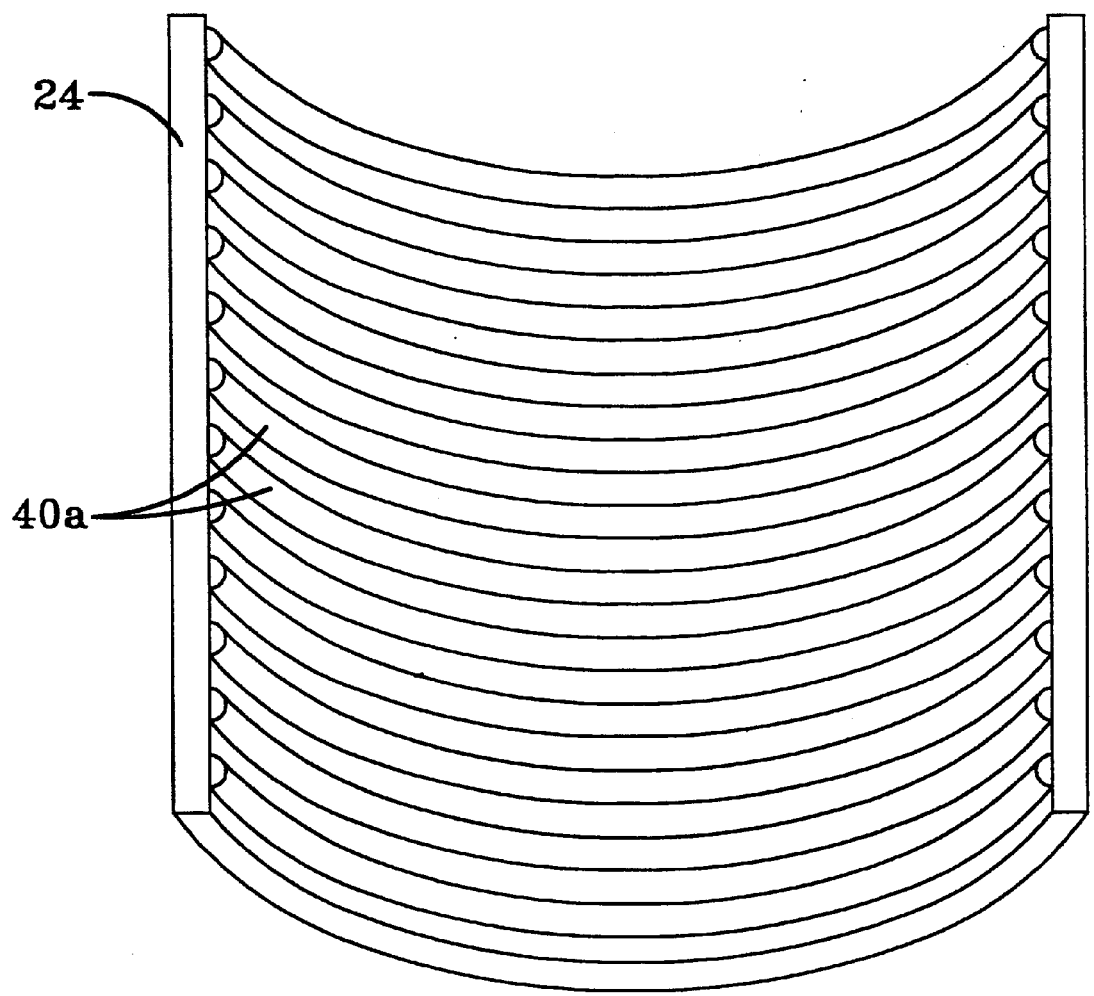
FIG. 4a is a top view of an adhesive pattern applied using the tool illustrated in FIG. 4 for a bearing assembly in accordance with the present invention.

Referring now to FIG. 4, use a grooved trowel 40 as illustrated to spread the adhesive on the housing. A trowel can be manufactured by machining grooves into a trowel. The grooves should be on the order of 0.09375 inches wide, 0.0625 inches deep with a 0.125 inch separation between grooves. The grooves in the trowel cause the adhesive to be spread with alternating parallel circumferential lines of adhesive which, when compressed by the bearing sections, smooths out to a constant thickness adhesive layer with little or no voids. The pattern of parallel adhesive lines 40a is illustrated in FIG. 4a. With the preferred trowel, an adhesive thickness of less than or equal to 0.005 inches, and preferably 0.001 inches can be obtained. The adhesive must be applied carefully to give the preferred thickness of approximately 0.001 inches in order to have maximum adhered strength with the strata. If the adhesive layer becomes too thick, fracturing or brittle cracking may occur. Bond one circumferential bearing half at a time, stopping at the side centerline.

Then place each bearing section on the adhered ID. Use a roller to mash the elastomer sheets against ID surface of the composite shell.

Figure 5:
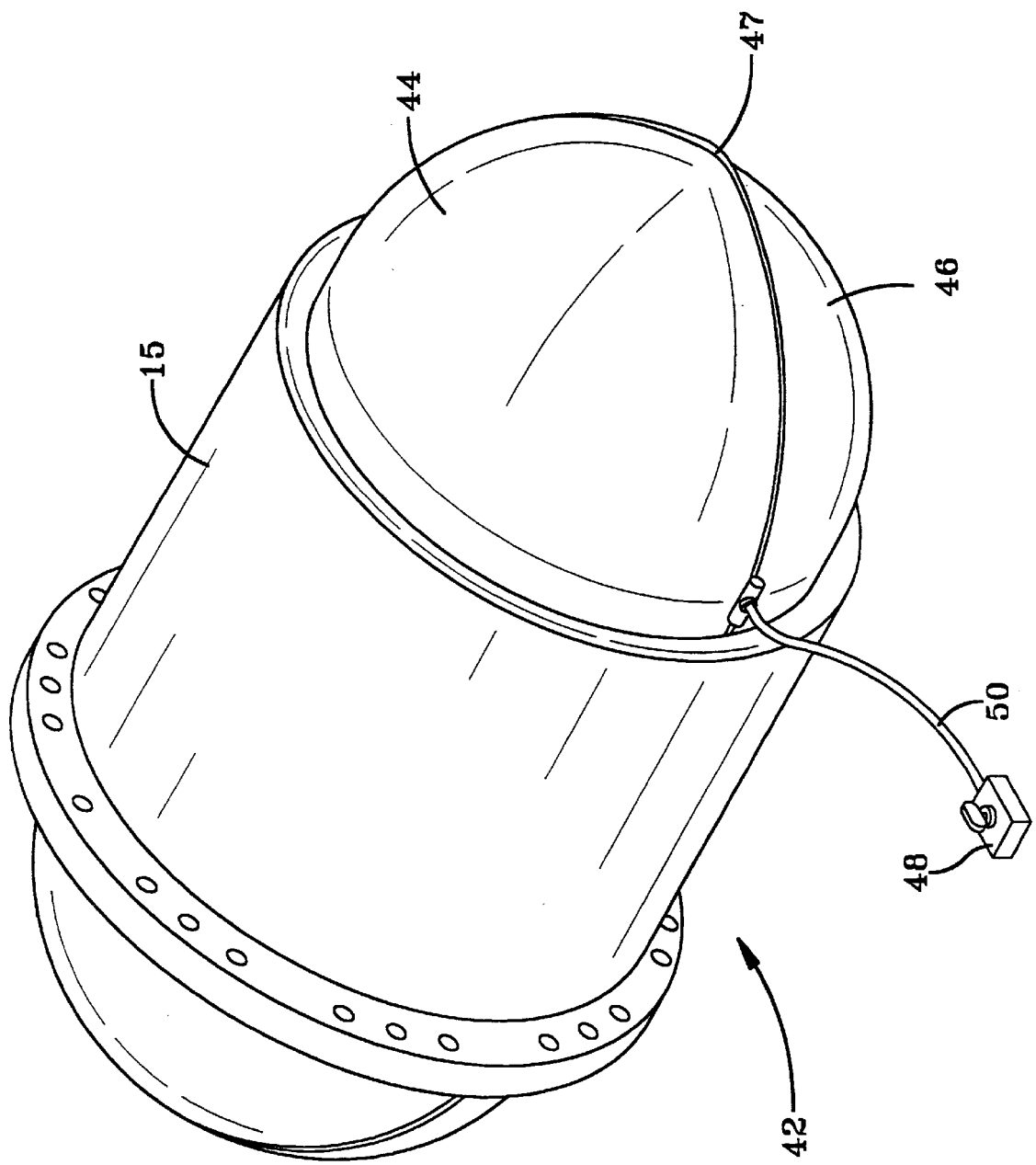
FIG. 5 is an isometric view of a bearing assembly in accordance with the present invention while curing in accordance with the present invention.

2. Referring now to FIG. 5, center an inflatable airbag 42 inside the housing ID. Airbag 42 is preferably made of two elastomeric sheets 44, 46 bonded (or otherwise attached) together at their respective outer edges 47. An inflation valve 48, pressure gage and tube 50 are provided to inflate the bag 42. Place a rubber shim (approximately 0.50 inches thick) on top of the bag. Inflate the bag 42 to about 3.5 psig and let it set for 7 hours or longer. Utilizing airbag 42 ensures that equal radial pressure is applied over the entire bearing surface. Since airbag 42 is made from relatively soft (Shore A=65+/−5) elastomers, no damage is done to the bearing surface. It is to be noted that airbag 42 naturally fills out from the middle of the bag to the ends, thereby helping to eliminate air bubbles by pushing any air bubbles present in the adhesive out the ends of the housing as the adhesive spreads to an even layer.
3. The adhesive should be cured at room temperature and at atmospheric pressure, since heat and pressure will unfavorably change the coefficient of friction and wear characteristics of the rubber bearing material 22, plus thin out the adhesive layer. After the adhesive has set, deflate the airbag and remove.

D. Splitting and Machining 45° Angles

1. The bearing sections 20 are then set up on a horizontal boring machine, where they are split and the side angles machined on them.
2. Clean the housing and housings with methylethylketone (MEK). Assemble the bearing and install the retaining rails. Shim along the rails if necessary with stainless steel shims.

It is to be noted that the present invention avoids any machining on the elastomer bearing surface, thereby maintaining a smooth, glass like finish which keeps the water lubricated coefficient of friction at a very low level. Said machining is avoided by accurately machining the bearing housing 15 inner diameter, accurately machining the bonding surface only of each elastomer bearing section, using a grooved trowel to spread the bonding agent on the housing inner diameter, and utilizing an airbag to apply gentle, even pressure to the bearing sections while the adhesive is curing. Inflation device 42 may utilize a fluid other than air as the medium to apply radial pressure for curing the bearing material to the bearing housing. Also, the housing may be cut into smaller units in order to better facilitate installation of the elastomer bearing sections and then reassembled prior to curing or installation.

Figure 6A:
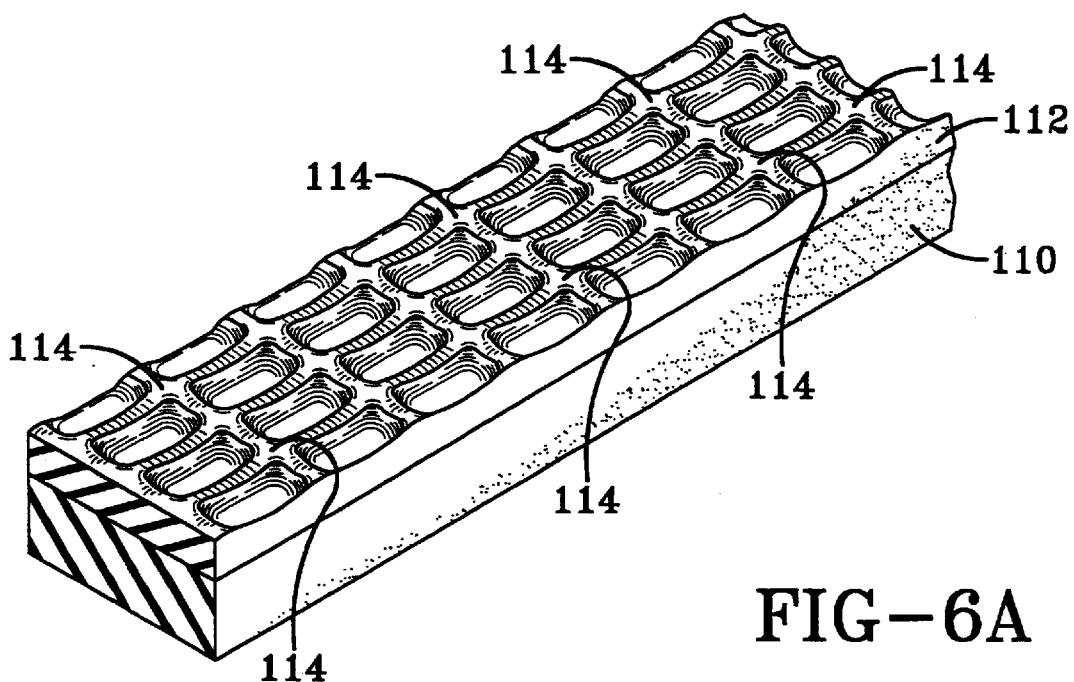
FIGS. 6a–6b are isometric views of alternate embodiments for bearing material for use in a bearing assembly in accordance with the present invention.
Figure 6B:
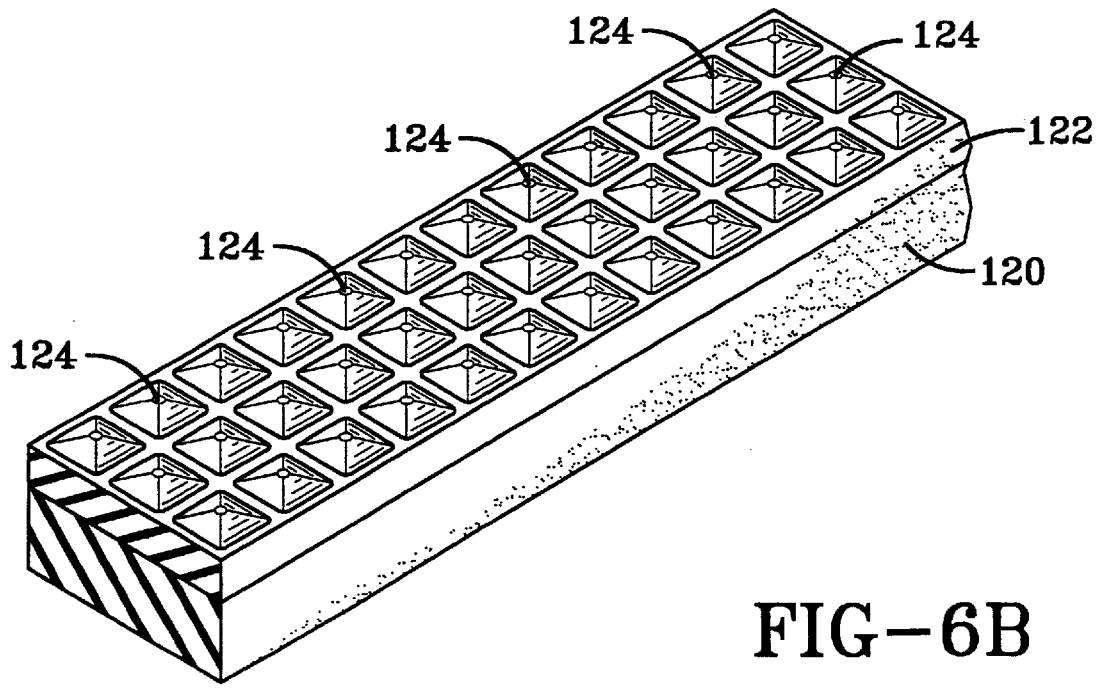

Referring now to FIGS. 6a–6b, wherein alternate embodiments of bearing material 22 for bearing sections 20 is illustrated. The bearing material 22 is molded in large flexible slabs. The material is molded and shaped against a rough fabric or plate with many protuberances. The molded slabs consist made from an elastomeric/plastic composite, such as that described in commonly owned U.S. Pat. No. 3,993,371 or most preferably a homogeneous slippery polymer alloy (SPA) such as is disclosed in U.S. Pat. Nos. 4,725,151 and 4,735,982, all of which are hereby fully incorporated herein by reference. The SPA bearing material layer is preferably on the order of 0.125 inches thick. It is then adhered during slab cure to a nitrile rubber backing sheet. The rubber backing makes the slab flexible, and when abraded, is easy to bond to the metal or composite bearing housing using room temperature curing epoxy adhesives or contact cement. The rubber backing is rapidly and easily sanded or ground by means of a machine to give the correct overall slab thickness for the particular bearing size. The adhesive layer adds around 0.001 inches to the bearing total wall thickness. There is therefore no need to grind or machine the bearing surface. Grinding the bearing surface increases friction and wear.

Referring now to FIG. 6a, an alternate bearing material 22 may be manufactured by providing a bottom layer 110 of elastomer in a mold. The preferred elastomer is catalog number H-212 available from the B.F.Goodrich Company. Next, a top layer 112 of slippery polymer alloy (SPA) is provided on the elastomer. A thermoplastic and a thermoset rubber compound, along with a smaller amount of a lubricant form the SPA. The SPA is a heterogeneous composition wherein the thermoplastic exists in a continuous phase and the thermoset is dispersed therein as a discontinuous phase. In other words a thermoplastic matrix is formed, having the thermoset compound and the lubricant dispersed therein, as opposed to an admixture.

The thermoplastic compound can be any polymer which exhibits tough, low friction and good wear resistant properties. A specific group of such polymers are the various ultra high molecular weight polyethylenes (UHMWPE) which are known to the art as well as to the literature. Ultra high molecular weight polyethylene are generally classified as those having a weight average molecular weight of greater than 2.5 million, that is from about 3.0 million to about 7.0 million using the solution viscosity method. A desired range is from about 4 million to about 6.5 million with a preferred range being from about 5 million to about 6 million. Such polyethylene are commercially available from Hoechst Celanese Corporation under the name GUR 413.

The ultra high molecular weight polyethylene as well as other polymers generally suitable for use in the present invention typically have low friction properties such as a breakaway coefficient of static friction at 0 rpm shaft speed of 0.25 or less, desirably 0.20 or less and preferably 0.15 or less. The desired thermoplastic compounds of the present invention also have a toughness as measured by a Izod notch impact test (ASTM D256) of 20 or greater and preferably of 30 or greater. However, unnotched test samples did not fail. The thermoplastic compounds of the present invention also have good wear resistance as measured by a sand slurry abrasion test. The sand slurry abrasion test is a test of Hoechst Celanese Corporation wherein generally a test specimen (1"×3"×¼") is rotated at 1200 RPM over a 24 hour period in a slurry containing 2 parts of water and 3 parts of sand.

An effective amount of the ultra high molecular polyethylene is utilized such that it forms a continuous phase in the SPA. Generally, the amount of a thermoplastic compound is sufficient to coat the thermoset rubber compound which generally exist in the form of particles and more desirably an amount in excess of that required to coat the rubber particles. Based upon the total weight of the SPA, the amount of the thermoplastic often utilized is from about 25% to about 90% by weight, desirably from about 40% to about 75% by weight and preferably from about 55% to about 65% by weight.

The thermoset compound is a cured rubber compound which typically has low friction as well as good oil and water resistant properties. By "low friction" it is meant that rubber bearings of a desired thickness range, when water lubricated, develop hydrodynamic lubrication at normal journal (shaft) operating speeds. Thin rubber bearings develop hydrodynamic friction at lower shaft speeds than any other known bearing material due to the Plasto-Elastohydrodynamic effect. Hydrodynamic lubrication is the developing of a fluid film between the bearing and a rotating shaft. By the terms "oil and water resistant", it is meant that the elastomer is unaffected (not dissolved or softened) and the volume increase caused by swell in water is under 5%, and preferably under 3%.

Generally any rubber compound having such friction and water resistant properties can be utilized. A specific group of such compounds are various nitrile rubber compounds which are known to the art and to the literature. For example, the various Hycar nitrile rubbers manufactured by the BFGoodrich Company can be utilized. The various harder nitrile rubber compounds are generally preferred. A specific example of such a rubber is compound H-201 (80±5 Shore A hardness) manufactured by the BFGoodrich Company. Another example is a softer nitrile rubber such as compound H-203, also manufactured by the BFGoodrich Company which has a Shore A hardness of about 70±5. Other rubbers include Butyl rubber, EPDM, that is rubber made from ethylene-propylene-diene monomers, and fluorelastomers based on the copolymer of vinylidene fluoride and hexafluoropropylene thought to have the following repeating structure —CF—CH—CF—CF(CF)—. Such copolymers are sold under the Trademark "Viton" by DuPont. Although these other rubber compounds can be utilized, the nitrile rubbers are highly preferred because of their elastic and creep deflection properties.

It is an important aspect of the present invention that the cured rubber compound can be initially dry blended or mixed with the thermoplastic compound before the alloy is formed.

Accordingly, the rubber compound is cured and in order to mix the two components, it is ground to a suitable size. Conventional grinding methods can be utilized such as mechanical or cryogenic grinding. Particle size of the cured rubber compound is generally important. The particle size is generally measured as being finer, that is being able to pass through, a specific Tyler mesh screen. The cured rubber compounds thus generally have a particle size smaller than 35 mesh, desirably smaller than 65 mesh, and preferably smaller than 100 mesh. The amount of the cured rubber in the SPA is generally from about 10% to about 70% by weight, desirably from about 12% to about 40% by weight and preferably from about 15% to about 30% by weight based upon the total weight of the SPA.

The lubricant is generally added in the form of a solid and hence is non-liquid. In order to ensure a good dispersal thereof, the lubricant typically is in the form of a powder. By the term powder, it is meant that a majority, and at least 70%, 80% or 90% and more desirably at least 95% of the particles are smaller than a Tyler 100 mesh screen, that is 150 microns. Desirably, a majority of the powder, typically 80%, 90%, or even 95% is smaller than 200 mesh, that is 75 microns. Preferably a majority of the graphite powder, that is 70%, 80%, or 90% is smaller than 325 meshes, that is 44 microns. Any lubricant known to the art as well as to the literature can be utilized which imparts lubricating properties to the SPA. By lubricating properties it is meant that the coefficient of friction of the surface of the formed SPA is reduced, as for example, on the order of at least 10% and more desirably at least 20% or 30% when wear starts. The lubricant also should be nonabrasive. Graphite constitutes a preferred lubricant. An example of a specific graphite is grade 117-A, manufactured by Asbury Graphite Mills, Inc. Another specific lubricant is molybdenum disulfide. Although not generally preferred, molybdenum disulfide is desirable in dry end use applications where moisture is not available, even as atmospheric moisture vapor. Silicone oils can also be utilized in an amount of from about 2% to about 10% by weight and desirably from about 3% to about 6% by weight based upon the total weight of the SPA. Examples of specific silicone oils include 200 Fluid manufactured by Dow Corning. Another acceptable lubricant is PTFE (polytetrafluorethylene) available from DuPont deNemours E.I. Company.

The amount of the lubricant generally is from about 0.5% or 3% by weight to about 25% by weight, desirably from about 1.0% to about 20% by weight, and preferably from about 2% to about 10% by weight based upon the total weight of the SPA.

Next, a pattern is transferred into the top layer of the bearing surface of bearing material 22. The pattern provides a plurality of protuberances, lands, or contact points 114 that protrude axially inward from the top layer 112. The protuberances 114 can each individually become hydrodynamic bearing surfaces when fluid lubricated. The preferred method of transferring this pattern is to place a very smooth, thin polyester sheet between a piece of heavy, loose knit or loose weave fabric and press the polyester sheet and fabric into the surface of SPA bearing material 22 before curing. The fabric is preferably catalog no. 8708 available from Georgia Duck. The polyester sheet is preferably 0.003 inch thick MYLAR. The polyester sheet smooths out the resultant SPA layer and rounds the corners of the protuberances 114. It is to be noted that prior to pressing the polyester and fabric into the material, the fabric should be sprayed with a mold release, such as catalog no. RTC 9110, manufactured by Chem-Trend, in a manner well known in the art to ensure the fabric can be removed after curing. After the fabric and polyester sheet have been placed on top of the uncured bearing section it should be pressed in, such as by closing the mold. The material is then molded for approximately 4.5 hrs. under pressure of approximately 1000 to 1500 psi at approximately 350° F. After this molding process, the temperature of the mold is allowed to return to ambient while the pressure is maintained. The mold should be allowed to cool down for approximately 1 hr. after molding. It has been found that cooling the composite under pressure helps to prevent warping of the final article. Application of water to the outside of mold may also be utilized to reduce the mold cooling time to 1 hour to prevent warping of the finished product.

Referring now to FIG. 6b, an alternate bearing material may be manufactured in accordance with the procedure for the composite illustrated in FIG. 6a, thereby yielding a composite having a bottom layer 120 of elastomer and a top layer 122 of SPA having diamond shaped protuberances, lands, or contact points 124 provided therein. The protuberances or lands 124 protrude axially inward and can each individually become hydrodynamic bearing surfaces when fluid lubricated. The diamond shaped pattern in the top layer 122, however, is provided by utilizing a rubber mold having the appropriate impression or pattern provided therein. A polyester release sheet, such as MYLAR, may be placed between the rubber mold and the SPA before curing. The polyester sheet is preferably on the order of 0.003 inches thick. The polyester sheet smooths out the resultant SPA layer and rounds the corners of the protuberances.

It is to be noted that other shape and size patterns not specifically disclosed herein maybe provided in the top alloy layer in order for the bearing to be hydrodynamic.

Although the invention has been shown and described with exemplary embodiments thereof, it should be understood by those skilled in the art that the foregoing and various other changes, omissions and additions may be made therein and thereto without departing from the spirit and scope of the invention.

We claim:

1. A bearing assembly and housing for use in supporting a water lubricated propeller shaft in large naval ships, said assembly and housing comprising;

an outer cylindrical housing having an inner surface defining an annular cavity; and a plurality of partial arc bearing sections attached to the inner surface of said housing, each section extending partly around said inner annular cavity, each of said partial arc bearing sections comprising:

a composite cylindrical shell having an inner circumferential surface and an outer circumferential surface, the outer circumferential surface of said shell being attached to the inner surface of the housing; and an elastomeric bearing layer bonded to the inner circumferential surface of said shell; and retaining means for holding said partial arc bearing sections to said cylindrical housing.

2. A bearing assembly and housing as defined in claim 1, wherein said elastomeric bearing layer is comprised of a material having a shore A hardness of less than 90.

3. A bearing assembly and housing as defined in claim 1, wherein said composite shell is comprised of fiberglass reinforced epoxy.

4. A bearing assembly and housing according to claim 1, wherein said partial are bearing sections each extend circumferentially approximately 180°.

\* \* \* \* \*